UNITED STATES PATENT OFFICE.

CARL DUISBERG, OF ELBERFELD, GERMANY, ASSIGNOR TO THE FARBEN-FABRIKEN, VORMALS FR. BAYER & CO., OF SAME PLACE.

TETRAZO DYE.

SPECIFICATION forming part of Letters Patent No. 467,162, dated January 19, 1892.

Application filed July 16, 1891. Serial No. 399,694. (Specimens.) Patented in Germany November 19, 1885, No. 40,247; in England November 24, 1885, No. 14,424; in France December 19, 1885, No. 173,042; in Austria-Hungary May 7, 1886, No. 20,062 and No. 48,178, and in Italy June 30, 1886, No. XXXIX, 329.

*To all whom it may concern:*

Be it known that I, CARL DUISBERG, doctor of philosophy and chemist, (assignor to the FARBENFABRIKEN, VORMALS FR. BAYER & Co., of Elberfeld,) of Elberfeld, in the Empire of Germany, have invented a new and useful Improvement in the Manufacture of a Direct-Dyeing Coloring-Matter, (for which the aforesaid FARBENFABRIKEN have already obtained Letters Patent in Germany, No. 40,247, dated November 19, 1885; in England, No. 14,424, dated November 24, 1885; in France, No. 173,042, dated December 19, 1885; in Austria-Hungary, No. 20,062 and No. 48,178, dated May 7, 1886, and in Italy, No. 39/329, dated June 30, 1886,) of which the following is a specification.

My invention relates to the production of a new blue mixed tetrazo coloring-matter, the composition of which corresponds with the formula—

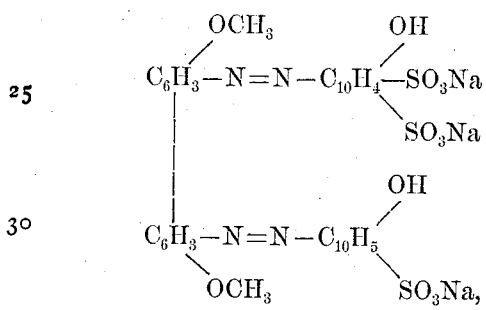

and which I have obtained by combining one molecular proportion of the tetrazo derivative of dianisidine (diamido-orthodiphenol dimethyl-ether) with one molecular proportion of the beta-naphthol disulpho-acid R, (obtained by the sulphonation of beta-naphthol, according to the German Patent No. 3,229, dated April 24, 1878,) and with one molecular proportion of alpha-naphthol alpha-monosulpho-acid, (Neville-Winther,) which is produced, for example, by boiling diazotized alpha-naphthionic acid with diluted sulphuric acid, according to the German Patent No. 26,012, dated February 27, 1883.

In carrying out my process practically I proceed as follows: 24.4 kilos, by weight, of diamido-orthodiphenol dimethyl-ether (dianisidine) are dissolved in about three hundred and seventy-five liters of water and 48.8 kilos of muriatic acid of the specific gravity 1.161. After this solution has carefully been cooled by ice fourteen kilos, by weight, of sodium nitrite dissolved in water are slowly added. The thus-produced reddish-yellow solution of the tetrazo-diphenol dimethyl-ether is then added to 34.8 kilos, by weight, of the sodium salt of the beta-naphthol disulpho-acid R, in order to form the so-called "intermediate" product of one molecule of the tetrazo-ether with one molecule of the latter naphthol disulpho-acid, which combination is most advantageously to be performed by the addition of the soda salt of acetic acid. When, after standing for some hours, the reaction is completed, the whole mixture is added to a watery solution containing about twenty-seven kilos of the sodium salt of alpha-naphthol alpha-monosulpho-acid, (Neville-Winther,) taking care by the addition of sodium carbonate that the liquid remains alkaline during the whole operation. After about twenty-four hours, when the formation of the dye-stuff is complete and the naphthol monosulpho-acid has been joined to the second diazo group, the new coloring-matter, which separates owing to its insolubility in cold water containing salts, may directly be filtered off and thereupon dried.

My new dye-stuff as to its composition and its properties differs from those coloring-matters produced according to Schultz's note in the *Berliner Berichte*, XVII, 461. This author therein mentions a blue product which he obtained by heating a mixture of one molecule of tetrazo-diphenyl with two molecules of beta-naphthol disulpho-acid R in alkaline solution, which he separated by salting out, and which possesses the following properties: It dissolves in water with blue color, which is changed into red by the addition of alkalies, while by acidulating a violet precipitate is separated, which is again colored blue by heating. Schultz is of the opinion that this product is not a common azo dye-stuff, but a condensation product of such a one. He has prepared and described in the same note products analogous and of equal properties by coupling the tetrazo derivatives of other diamines—for instance, that of diethoxydiamidodiphenyl with two molecules of beta-naphthol disulpho-acid R, likewise in alkaline solution—and he specifies that by employing beta-naphthol disulpho-acid G or one of the two beta-naphthol monosulpho-acids instead of beta-naphthol disulpho-acid R only red dye-stuffs were resulting. This affirmation is, according to my researches, not exact, as I have found that by combining one molecule of tetrazo-diphenyl ether with two molecules of naphthol sulpho-acids quite generally violet to blue tetrazo coloring-matters are obtained, which thereupon have been secured to the aforesaid Farbenfabriken by the German Letters Patent No. 38,802, dated November 19, 1885, while that product resulting from the combination of one molecule of tetrazo-diphenylethyl-ether at first prepared by Schultz has distinctly been excluded from the products secured by that latter Letters Patent, as this combination is quite valueless and has ever since remained without any importance. Among the dye-stuffs of the German Patent No. 38,802 there are, however, very valuable products, especially the combination of one molecule of the tetrazo derivative of dianisidine with two molecules of alpha-naphthol alpha-monosulpho-acid, (Neville-Winther,) which product is precisely described in my American Letters Patent No. 357,273, dated February 8, 1887. I have afterward found that valuable dye-stuffs may be obtained by combining with one molecule of a tetrazo-diphenylether at first one molecule of any naphthol sulpho-acid and then one molecule of another naphthol sulpho-acid, producing in this manner so-called "mixed" tetrazo-diamido diphenylether dye-stuffs, which essentially differ from those matters which are mentioned in Schultz's note and derived from dianisidine, as these latter are obtained by combining one molecule of tetrazo-diethoxy-diphenyl chloride with two molecules of the same beta-naphthol disulpho-acid R. Such mixed coloring-matters as I have first described, joined with a great many other analogous products, thereupon have been secured to the Farbenfabriken, vormals Fr. Bayer & Co., of Elberfeld, by the German Patent No. 40,247, dated February 9, 1886. The combination which corresponds with the above-mentioned formula and which forms the matter of this specification is, as to its value, nearly equivalent to the dye-stuff of my American Letters Patent No. 357,273, dated February 8, 1887, mainly differs, however, from the last-named dye-stuff by its composition and its properties. While the latter is produced from out dianisidine after its diazotation with two molecules of alpha-naphthol alpha-monosulpho-acid, (Neville-Winther,) my new dye-stuff, according to its formation, contains one molecule of the tetrazo compound of dianisidine, in combination with one molecule of beta-naphthol disulpho-acid R and one molecule of the alpha-naphthol alpha-monosulpho-acid, (Neville-Winther). In a dried state the dye-stuff of my above-mentioned American Letters Patent No. 357,273 forms a bluish-black powder soluble in water with blue-violet color, which solution is colored magenta red by the addition of alkalies. It is dissolved by water with blue color, from out which solution, when mixed with a large quantity of water, a blue-violet precipitate is separated. It dyes unmordanted cotton in soap bath a pure blue.

My new dye-stuff of the above-mentioned formula, on the contrary, is characterized by the following properties: It forms a blackish-brown amorphous powder with copper-like luster, is sparingly soluble in cold water, and more easily and with greenish-blue color in hot water. It dissolves in the solutions of the alkalies with bluish-red color, in fixed ammonia with reddish-violet color. By the addition of mineral acids to its watery solution a blue precipitate is separated. In concentrated sulphuric acid it is soluble with greenish-blue color, and dark-blue flakes are separated by adding a large quantity of water to such a sulphuric-acid solution of the dye-stuff. It dyes cotton not mordanted in a boiling bath, only containing common salt, in greenish-blue shades.

Having thus precisely described my invention and in what manner it is to be performed, that which I claim as new and desire to secure by Letters Patent is—

1. The process for the production of a new direct-dyeing tetrazo dye-stuff, which consists in combining with one molecular proportion of dianisidine after its diazotation one molecular proportion of beta-naphthol disulpho-acid R, and then one molecular proportion of alpha-naphthol alpha-monosulpho-acid, (Neville-Winther.)

2. The new dye of the formula herein specified, which is a blackish-brown amorphous powder with copper-like luster, sparingly soluble in cold water, more readily with greenish-blue color in hot water, and in solutions of the fixed alkalies it dissolves with bluish-red, but in ammonia with reddish-violet color and in concentrated sulphuric acid with greenish-blue color, from which latter solution dark-blue flakes are separated by the addition of a large quantity of water, and on addition of mineral acids to the watery solution of this dye-stuff a blue precipitate is separated.

CARL DUISBERG.

Witnesses:
WM. DIESTEL,
HUGO BOEDELINGHAUS.